US006633321B1

(12) United States Patent
Maurer

(10) Patent No.: US 6,633,321 B1
(45) Date of Patent: Oct. 14, 2003

(54) METHOD FOR RECORDING IMAGE INFORMATION

(75) Inventor: Thomas Maurer, Munich (DE)

(73) Assignee: Maurer Electronics GmbH, Munich (DE)

( * ) Notice: Subject to any disclaimer, the term of this patent is extended or adjusted under 35 U.S.C. 154(b) by 0 days.

(21) Appl. No.: 09/612,984

(22) Filed: Jul. 10, 2000

(51) Int. Cl.[7] .............................. B41J 2/435; G09C 3/00
(52) U.S. Cl. .......................................... 347/224; 283/77
(58) Field of Search ................................ 347/224, 112; 235/469, 470; 283/72, 74, 75, 85, 94, 77; 382/115, 118, 164, 165; 430/10

(56) References Cited

U.S. PATENT DOCUMENTS

| | | | | |
|---|---|---|---|---|
| 5,350,198 A | * | 9/1994 | Bernecker | 283/77 |
| 5,421,619 A | | 6/1995 | Dyball | 283/86 |
| 5,787,186 A | * | 7/1998 | Schroeder | 382/115 |
| 5,949,055 A | * | 9/1999 | Fleet et al. | 235/469 |

FOREIGN PATENT DOCUMENTS

| | | |
|---|---|---|
| EP | 486482 | 12/1987 |
| EP | 537484 | 4/1993 |
| EP | 805409 | 11/1997 |
| GB | 2281535 | 8/1994 |
| WO | WO 95/31338 | 5/1994 |

* cited by examiner

*Primary Examiner*—Hai Pham
(74) *Attorney, Agent, or Firm*—Lawrence E. Laubscher, Sr.

(57) ABSTRACT

The invention relates to a method for recording image information on a data carrier which has a substrate that can have optically identifiable information written to it by the application of radiation, and an image-carrying area suitable for the application of information, in which the whole image information of an image to be recorded is applied to the image-carrying area. In order to increase the tamperproofness of the image to be recorded and the identifiability of the said image, without adversely affecting the brilliance and colour fidelity of the image, the invention provides for a portion of the image information that is to be recorded to be additionally written to the substrate with the aid of radiation.

16 Claims, 2 Drawing Sheets

METHOD FOR RECORDING IMAGE INFORMATION

BACKGROUND OF THE INVENTION

1. Field of the invention

The invention relates to a method for recording image information on a data carrier.

2. Description of the Prior Art

A known data carrier or recording medium for coloured or chromatic image information (EP0537484A1), which is used in particular as a debit or identity card, comprises a card inlay, acting as a light-diffusing background, and a transparent sheet which is arranged on said inlay and on which a colour-accepting layer is arranged. The transparent sheet serves as a substrate to which optically identifiable information can be written by the carbonisation or blackening of the sheet material with the aid of laser radiation. The colour-accepting layer can be printed in colour by the coating or introduction of colorants.

In order to record a chromatic or coloured image on this known recording medium, firstly the image information of the image to be recorded is broken down into a light/dark component and at least one colour separation, as the coloured component. The light/dark component is then written to the transparent sheet with the aid of a laser beam recorder, thereby producing the regions of a grey-shade image which are blackened to a greater or lesser extent. Afterwards, the colour separation or separations of the image information is or are superposed on the grey-shade image by appropriate colorants being applied to or introduced into the colour-accepting layer.

Although this known method makes it possible for chromatic images to be applied to data carriers in a relatively tamperproof manner, it does not afford any advantages for the visual identification of images. The visual identification results almost exclusively from the analysis of geometrical relationships and forms in the image, colours present in the image having hardly any importance for the identification of the image. In many cases it has even been demonstrated that the colours present in an image not only do not improve identification processes but even, under certain circumstances, impede them. Such effects are known for example as "colour shock" in psychology. Such colour shock effects were demonstrated also in official identification test series.

However, merely producing a light/dark component for physically safeguarding a photograph or image on a data carrier not only affords no advantages in terms of official identification, but is also problematic from an aesthetic standpoint, since the brilliance of the colour information is normally vitiated to a considerable extent by black-and-white information additionally applied in the substrate. Such a grey haze can be compensated for only to a very limited extent by increasing the colour saturation in the originally applied colour information.

Taking this as a departure point, the invention is based on the object of providing a further method for recording image information on a data carrier, which makes it possible, in particular to record a brilliant colour image simply in a tamperproof manner such that it can readily be identified.

SUMMARY OF THE INVENTION

According to the invention, then, features relevant to identification are recorded on the data carrier in addition to a processed or non-processed image corresponding to an original image, which features have been obtained from the original image. In this way, it is possible to apply a complete colour image with high brilliance and resolution to the data carrier, the identifiability of the image being improved by the additional recording of features relevant to identification. If the original image is, in particular, a portrait photograph which is intended to be recorded as a so-called passport photograph on the data carrier, then the method according to the invention enables the photograph to be applied to a document serving as a data carrier in such a way that it is aesthetically acceptable to the owner of the document but at the same time it also has enhanced identifiability for official identification purposes.

Thus, the method according to the invention makes it possible to separate in particular official identification features of a photograph from the aesthetic features and introduce them into the data carrier in a physically secured manner. The advantage resides in the fact that the aesthetic configuration of the photograph, for which colour is of great importance, can be realised independently of the configuration securing the identifiability of the photograph or image, in a separate step.

The features relevant to identification are preferably obtained by a spatial analysis of the original image, the spatial analysis being applied to one or more colour separations of the original image.

It is particularly advantageous if spatial filters are used for obtaining features relevant to identification. The spatial filtering of the image information with a spatial filter or with a suitable combination of spatial filters yields the edges and lines present in the image to be recorded with the result that, after filtering, only a line drawing or a so-called "sketch", is present if the filter or filters used is or are chosen in a suitable manner. This line drawing or sketch already suffices in its own right to enable the image that is to be recorded to be unmistakably recognised in particular from standpoints of official identification.

For obtaining or extracting the features relevant to identification, the procedure, similar to the procedure with a caricature, is that firstly, in a first phase, the image or the image information is reduced by iterative omission of non-essential details, that is to say of details which do not promote, or even obstruct, the identifiability. In a second phase, the reduced information is then transformed in such a way that it can be realised physically visibly in the most economical manner possible.

In order then to improve the human identifiability of faces with a simultaneous reduction in the data, the invention provides for a line drawing to be obtained from the original image as features relevant to identification, which line drawing is realised in the course of the buffer-storage and/or in the course of the recording of the image on the data carrier, in particular in vectorized form.

In order to improve the identifiability of a human portrait at the same time as the aesthetic impression, it is expedient if the features relevant to identification are superposed on the recorded image with register accuracy.

In an expedient development of the invention, it is provided that after the image has been recorded, its position on the data carrier itself is acquired and the features relevant to identification are recorded on the data carrier in accordance with the acquired image position. This makes it possible for the image that is to be recorded and the features relevant to identification to be recorded on the data carrier in a particularly simple manner, in particular with congruence exhibiting register accuracy, without special alignment or orientation markers having to be provided for this purpose on the data carrier.

It is particularly expedient if in order to improve the visibility of the features relevant to identification, the recorded image is the original image whose colour and/or spatial information content has been transformed or reduced in a suitable manner.

In order to further improve the tamperproofness, it may be provided that the line drawing is transformed or integrated into a security background of the data carrier.

A further possibility is for the features relevant to identification to be recorded on the data carrier with no direct spatial reference to the recorded image.

The features relevant to identification which are obtained from the original image can thus be recorded on the data carrier in different ways, where the respective ways can be applied individually or in combination. By way of example, it is possible both to integrate the features relevant to identification which are present as a line drawing into the security background of the data carrier and to superpose them with register accuracy with the portrait photograph. Recording without a direct spatial reference can also be combined with register-accurate recording and/or integration of the features relevant to identification into the background.

If the features relevant to identification are intended to be applied to the data carrier only as a sketch without direct spatial reference to the recorded photograph, then it is particularly advantageous if the features relevant to identification are recorded on a special region of the data carrier which has been prepared for the realisation of double- or tilted-image effects.

In order to improve not just the tamperproofness of the data carrier but the data protection in its entirety during the production of the data carrier or document, it is provided that after the image has been recorded, its image information is acquired in order to determine therefrom the features relevant to identification which are to be recorded in addition to the image.

In an advantageous refinement of the invention, the image is applied to an image-carrying area, suitable for the application of information, of the data carrier having a substrate, and the features relevant to identification are written to the substrate with the aid of radiation.

This procedure is particularly advantageous if, by way of example, passport photographs or other images which individualize the data carrier and are stored in a central data memory are intended to be recorded on the data carrier in corresponding peripherals. Since the whole image information is firstly applied as a colour image, the data link to the central data memory or computer can be terminated after the coloured image has been applied. The determination and writing of the image features relevant to identification that are to be additionally written can then be carried out in the peripheral, without this necessitating a data link that may adversely affect the security of the data. A further advantage is that that portion of the total image which is intended to be additionally recorded correlates particularly exactly with the total image content.

In a further refinement of the invention, it is provided that the radiation used for recording the features relevant to identification not only causes blackening of the substrate but also alters the previously applied image in a controlled manner, by evaporation or combustion, in order, in this way, to visually emphasize the features relevant to identification.

On the other hand, it is also possible for the features relevant to identification which are recorded under the previously applied image by means of radiation in the substrate to be written, without destroying the recorded image, through the latter to the substrate.

The recording of the desired image information can be realized in a particularly simple manner when the features relevant to identification are written to the substrate by means of laser radiation, preferably by means of infrared laser radiation.

A further refinement of the invention is distinguished by the fact that the features relevant to identification are used to produce further effects, such as e.g. water marks or the like.

It is particularly expedient if the image-carrying area is produced by coating the substrate provided for the recording of the features relevant to identification.

BRIEF DESCRIPTION OF THE DRAWING

The invention is explained in more detail below by way of example with reference to the drawings, in which:

In the various figures of the drawing, mutually corresponding parts are provided with the same reference symbols.

FIG. 1 illustrates, by way of example, an identity card as a data carrier 10 having a recording area 1 with an inscription region 2, an image region 3, a special effect region 4 and a region for general information 5. A security background 6, which is indicated only in a purely diagrammatic and greatly simplified manner, can be provided in individual or all regions 2 to 5 of the recording area 1.

Figure 1:
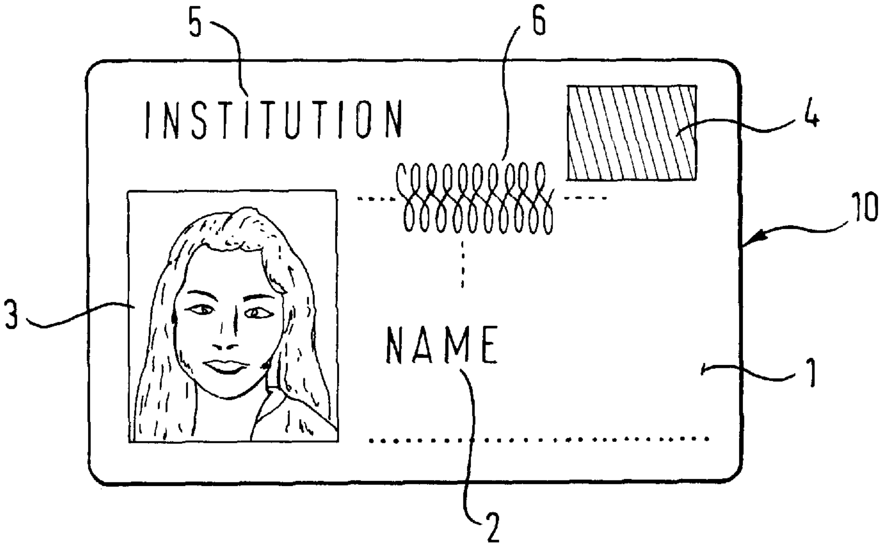
FIG. 1 shows a diagrammatic plan view of a data carrier (shown simplified), in particular of an identity card.

In order to record an image, in particular a portrait photograph of the authorized owner of a data carrier 10 serving as proof of identity, in a brilliant manner such that the features relevant to identification, that is to say in particular the characteristic facial features, can be readily identified, features relevant to identification are obtained from the original image and are then recorded on the data carrier 10 in addition to an image that is to be applied in the image region 3. In this case, the obtaining of the features relevant to identification can also be carried out after the image has been recorded. The image to be recorded, which is preferably printed on as a colour image 15, may in this case be the original image itself, or a processed image, in which recording defects have been eliminated both for aesthetic reasons and for official identification reasons.

The features relevant to identification are preferably obtained by a spatial analysis of the original image, but can also be obtained from one or more colour separations of the original image. In this case, the use of the colour separations for obtaining features relevant to identification has the advantage that it is also possible to ascertain colour boundaries at which the brightness value does not change and which, therefore, cannot be identified if only the brightness distribution or luminance of the original image is used for determining features relevant to identification.

The determination or extraction of the features relevant to identification from the original image with the aid of different filter methods and geometrical analysis algorithms with object-oriented selection categories serves for generating an additional image, in particular as a sketch or line drawing, that only contains features relevant to identification. In this case, the quantity of image data can be drastically reduced in particular if the features relevant to identification are present as a line drawing in vectorized form.

In particular if the features relevant to identification are present as line drawings, these can, for example, be integrated into the security background 6 or else be recorded at a different location on the recording area 1 without direct spatial reference to the image region 3.

In particular, it is possible in this case to arrange the line drawing in a special effect region 4, which has been prepared for example for so-called tilted image effects, in the case of which the image recorded there depends on the viewing angle, since it has been recorded and is viewed e.g. through a grid array of cylindrical lenses.

In addition to or instead of the recording of the line drawing relevant to identification at any desired points on the recording area 1, it is preferably provided that the features relevant to identification are superposed on the recorded image with register accuracy in the image region 3.

A description is given below, with reference to FIGS. 2 and 3, firstly of the structure of the data carrier for use with the method according to the invention.

Figure 2:
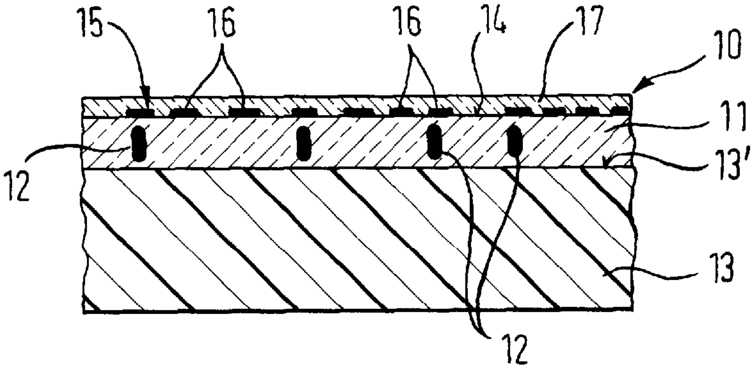
FIG. 2 shows a diagrammatic section through a data carrier with image information recorded thereon.
Figure 3:
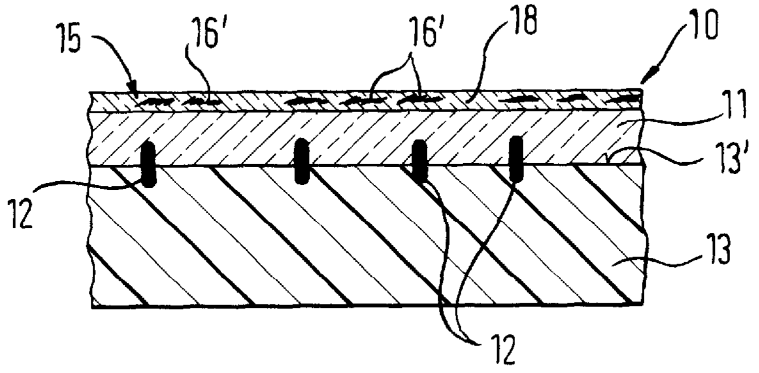
FIG. 3 shows a section through another data carrier with image information recorded thereon.

As shown by FIG. 2, the data carrier 10 comprises a substrate 11, which is formed for example by a transparent plastic layer, to which image information can be written by means of radiation, in particular laser radiation, preferably infrared (IR) laser radiation. For this purpose, the plastic material of the substrate 11 is blackened with the aid of the radiation by, for example, suitable additives and/or the plastic material of the substrate being carbonized by the laser radiation. Blackened dot regions 12 are thus formed in the substrate 11. The substrate 11 is, for example, laminated onto a white carrier layer 13 made of plastic or paper and has a colour image 15 printed on its surface 14 remote from the carrier layer 13. In this case, the colour image 15 is composed of corresponding colour dots 16 or colour image regions consisting of customary colorants which are applied in conventional printing methods.

The colour image 15 is covered by a transparent protective layer 17, which may consist for example of a lacquer coating printed onto the image-carrying surface 14.

As shown by FIG. 2, in order to increase the tamperproofness, the dot regions 12 can be formed in the substrate 11 in such a way that they extend partly into the carrier layer 13. In addition, the colour image 15 is formed by colour dots 16' produced by the introduction of colorants into a colour-accepting covering layer 18. In this case, the covering layer 18 may be additionally covered by a protective layer (not illustrated) or simultaneously serve as such a protective layer.

For the application of the method according to the invention, which is explained in more detail below, it is also possible to use any other data carrier having a transparent substrate which can be blackened by radiation, and having an image-carrying area. Various single- or multilayer structures are possible here. In the case of a data carrier in which the white carrier layer 13 can be printed with ink, the surface 13' bearing the substrate 11 can additionally be used as an image-carrying area.

In principle, the features of the image information which are relevant to identification can be written to the substrate 11 before the colour image 15 is printed on or introduced. As is described below, however, it is preferred to apply the colour image 15 first and then, as features relevant to identification, to write e.g. the contour component to the substrate 11.

In accordance with the method according to the invention, in order to record image information on the data carrier 10, a processed or non-processed image corresponding to the original image is applied, as a complete colour image, to the corresponding image-carrying area.

If the surface 13' of the carrier layer 13 is used as the image-carrying area in this case, then the colour image 15 is applied first of all. Afterwards, the substrate 11 is then laminated on for the purpose of writing further image information and the data carrier 10 is thus prepared for the next method step.

If the surface 14 of the substrate 11 is used as the image-carrying area, then the writing of the features relevant to identification to the substrate 11 with the aid of laser radiation can be performed either immediately after the colour image 15 has been printed on or after the protective layer 17 has been applied. In this case, it may be provided that, during the recording of the features relevant to identification, the previously applied colour image is altered in a controllable manner by evaporation or combustion in the region of the features relevant to identification in such a way that the features relevant to identification are visually emphasized.

If the colour-accepting covering layer 18 is used, the writing of the features relevant to identification preferably follows immediately after the recording of the colour image 15.

Thus, after the colour image 15 has been applied to the data carrier 10 and the latter has been prepared for the writing of image information to the substrate 11, the features relevant to identification are additionally written to the substrate 11 with the aid of IR laser radiation.

Figure 4:
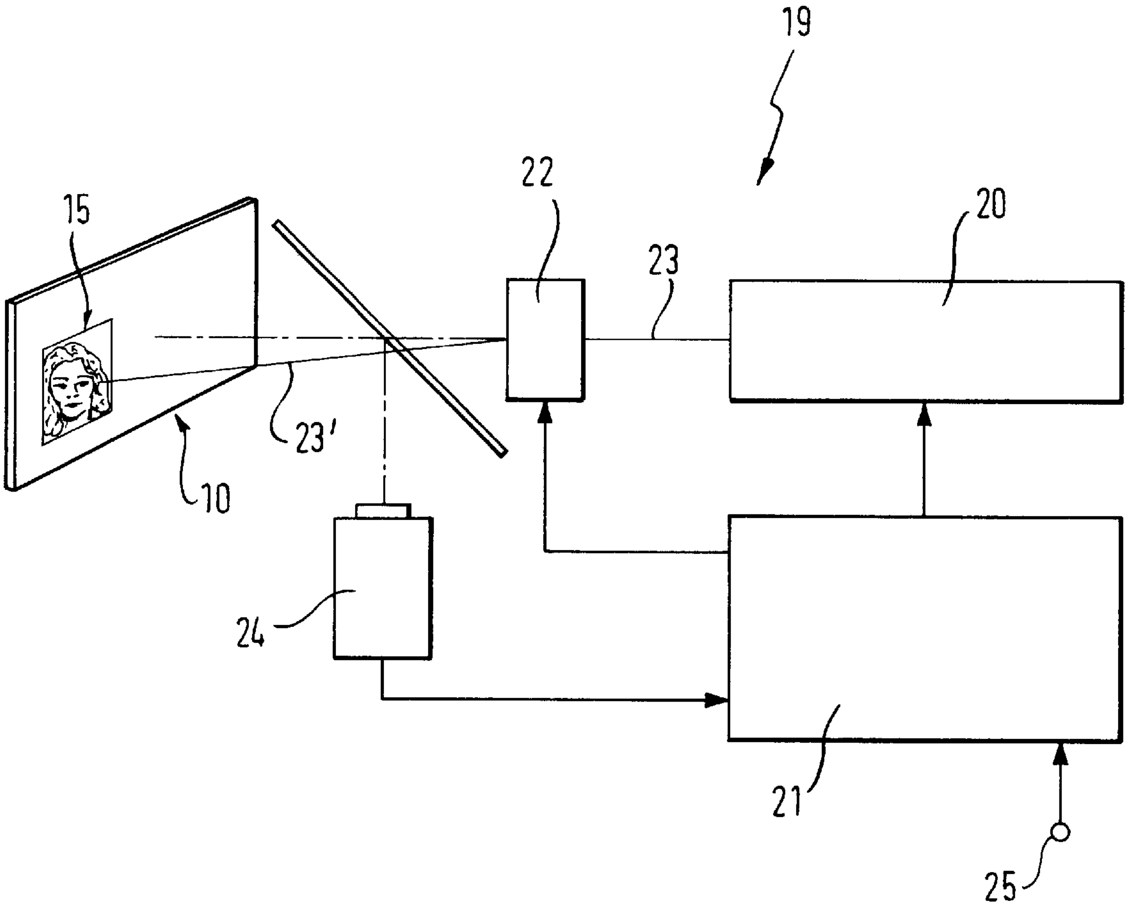
FIG. 4 shows a simplified diagrammatic block diagram of an apparatus for writing image information to a substrate of a data carrier by means of radiation.

For this purpose, the data carrier 10 in the form of a card, to which the complete colour image 15 (only shown in black and white in the drawing) has been applied, is arranged in a processing position in a laser engraving installation 19, as is illustrated diagrammatically in FIG. 4.

The laser engraving installation 19 comprises a laser 20 controlled by an arithmetic and control unit 21. A deflection unit 22, which is likewise controlled by the arithmetic and control unit 21 deflects the laser beam 23 in order to obtain a writing beam 23', which scans the data carrier 10. In addition, an image recording device 24, which may be a video camera for example, is arranged in such a way that it captures the positioning of the data carrier 10 in the laser engraving installation 19 or preferably the position of the colour image 15 on the data carrier 10 relative to the processing position in the laser engraving installation 19. Instead of a separate image recording device 24, it is also conceivable to utilize the deflection unit 22 as an image scanning unit and to assign an optical receiver arrangement to it. The position of the data carrier 10 and of the colour image 15 situated thereon is then acquired optically with the aid of the same optical elements which are also used to guide the writing beam 23' across the data carrier 10. However, to acquire the position of the data carrier 10 and of the colour image 15 in the operating position of the laser engraving installation 19, it is also possible to use any other optical position acquisition device which is suitable for supplying positional data for controlling the laser 20 and the deflection unit 22.

Thus, once the data carrier 10 carrying the complete colour image 15 has been arranged in the laser engraving installation 19, first of all the position of the colour image 15 is acquired in particular with the aid of the image recording device 24. For this purpose, by way of example, it is also possible to use position markers provided on the data carrier 10, which position markers were used to position the colour image 15 during the printing thereof. It is preferred, however, if markers (not illustrated) which are printed on together with the colour image 15 are used, since, in this case, the position of the markers is oriented relative to the colour image 15 practically without any manufacturing tolerance. Another particularly preferred possibility consists in using the colour image 15 itself as a "position marker" in order to control the laser 20 and the deflection unit 22.

Once the position of the colour image 15 in the processing position of the laser engraving installation 19 is thus known, a portion of the image information of the colour image 15 which characterizes and/or overdraws the colour image 15 is written, as features relevant to identification, to the substrate 11 with the aid of the laser. In this case, the intensity of the laser beam 23 and hence of the writing beam 23' as well is controlled by the arithmetic and control unit 21, for example with the aid of a shutter unit (not specifically illustrated) of the laser 20, in dependence on the point at which the writing beam 23' impinges on the colour image 15. The features relevant to identification are written to the substrate through the colour image 15, which, for this purpose, is constructed from printing inks or inks which either allow the laser radiation to pass unhindered and are not damaged in the process, or can be eroded in a targeted manner by the laser radiation.

The features of the original image which are relevant to identification, that is to say, by way of example, the lines of a sketch, may in this case be fed from a central computer to the arithmetic and control unit 21 via a data input 25, for example. However, it is also possible, with the aid of the image recording device 24, to record the colour image 15 applied to the data carrier 10 and to subject the image information obtained in this way to a spatial analysis with spatial filtering, in order, in this way, to obtain a portion of the image information which represents the features relevant to identification. In this case, for additionally writing the features relevant to identification to the substrate 11, it is not necessary to connect the laser engraving installation 19 to the central computer or to a central data memory.

In particular, it is also possible for image data that have been acquired dot by dot along an image line to be immediately subjected to spatial filtering, in order, in this way, to determine the features relevant to identification—which are to be written—from the colour image 15 itself practically in real time. This procedure has the advantage that the recorded colour image data as such need not be stored, thereby ensuring additional security against tampering during the handling of the data which individualize the data carrier 10.

If the spatial filtering of the image information is carried out using a high-pass filter such that a straightforward line drawing is obtained which is intended to be represented in a single degree of blackening without grey shades, then this has the advantage, without influencing the tamperproofness of the image recorded according to the invention, that a simple laser can be used in which the beam intensity or the intensity of the individual laser beam pulses need not be adjustable.

The method according to the invention enables a brilliant colour image having a high resolution in accordance with colour printing technology to be recorded on a data carrier 10 and the tamperproofness to be produced by virtue of the fact that image elements, e.g., a line sketch essentially corresponding to the image contours which are relevant to identification are additionally written to the substrate in a tamperproof manner. At the same time, this considerably improves the identifiability of images, in particular of passport photographs.

Even if it were possible to remove the colour image, the features relevant to recognition which are implemented in black and white, with or without grey shades, are nonetheless preserved in the substrate 11 and would considerably impair a new colour image if the latter were applied, with the result that the fact that the image has been tampered with can easily be identified just from the reduced image quality.

Although the method according to the invention for recording image information on a data carrier 10 has been explained with reference to a colour image 15 represented as a passport photograph, it can be applied to all single- or multi-coloured representations. With the method according to the invention, grey-shade images can also be recorded simply, in a tamperproof manner, on a data carrier and be improved in respect of their identifiability.

What is claimed is:

1. A method for recording information regarding an original image on a data carrier (10), comprising;

(a) recording on the data carrier a recorded image corresponding to the original image; and (b) recording on the data carrier in the form of a line drawing the features relevant to identification that are obtained by spatial analysis from said original image and wherein said special analysis is applied to one or more colour separations of the original image.

2. Method according to claim 1, characterized in that spatial filters are used for obtaining features relevant to identification.

3. Method according to claim 2, characterized in that said line drawing is obtained from the original image as one of said features relevant to identification, said line drawing being obtained in the course of the recording of the image on the data carrier (10), in particular in vectorized form.

4. Method according to one of claim 3, characterized in that the features relevant to identification are superposed on the recorded image with register accuracy.

5. Method according to claim 4, characterized in that after the image has been recorded, its position on the data carrier (10) itself is acquired and the features relevant to identification are recorded on the data carrier (10) in accordance with the acquired image position.

6. Method according to claim 4, characterized in that, said recorded image is the original image whose colour or spatial information content has been transformed.

7. Method according to claim 6, wherein said line drawing is integrated into a security background (6) of the data carrier (10).

8. Method according to claim 1, wherein said features relevant to identification are recorded on said data carrier (10) with no direct spatial reference to the recorded image.

9. Method according to claim 8, wherein said features relevant to identification are recorded on a special region (4) of the data carrier (10) which has been prepared for the realization of double- or tilted-image effects.

10. Method according to claim 1, characterized in that after said recorded image has been recorded, its image information is acquired in order to determine therefrom those features relevant to identification which are to be recorded in addition to the image.

11. Method according to claim 1, characterized in that said recorded image is applied to an image-carrying area (14, 13'), suitable for the application of information, of the data carrier (10) having a substrate (11), and in that said features relevant to identification are written to the substrate (11) with the aid of radiation.

12. Method according to claim 11, characterized in that said recorded image is recorded on the said image-carrying area (14, 13'), and further wherein said features relevant to identification are written through said recorded image to the underlying substrate (11).

13. Method according to claim 11, characterized in that said features relevant to identification which are recorded under the previously applied image by means of radiation in the substrate (11) are written, without destroying the recorded image, through said recorded image to the substrate (11).

14. Method according to claim 11, characterized in that said features relevant to identification are written on said substrate (11) by means of infrared laser radiation.

15. Method according to claim 11, characterized in that said image-carrying area is produced by coating the substrate (11) provided for the recording of said features relevant to identification.

16. A method for recording information on a data carrier (10), comprising:

(a) recording on the data carrier a recorded image corresponding to the original image; and (b) recording on the data carrier visually perceivable features relevant to identification that are obtained from said original image;

(c) said recorded image being applied to an image-carrying area (14, 13') of said data carrier suitable for the application of information, said data carrier (10) having a substrate (11), said features relevant to identification being written on the substrate (11) with the aid of radiation;

(d) the radiation used for recording said features relevant to identification not only causing blackening of the substrate but also altering the previously applied image in a controlled manner, by evaporation or combustion, thereby to visually emphasize the features relevant to identification.

* * * * *